(12) United States Patent
Watanabe

(10) Patent No.: US 10,917,398 B2
(45) Date of Patent: Feb. 9, 2021

(54) SERVER, CONTROL METHOD OF SERVER, AND STORAGE MEDIUM

(71) Applicant: CANON KABUSHIKI KAISHA, Tokyo (JP)

(72) Inventor: Akira Watanabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 251 days.

(21) Appl. No.: 15/970,029

(22) Filed: May 3, 2018

(65) Prior Publication Data
US 2018/0332031 A1 Nov. 15, 2018

(30) Foreign Application Priority Data
May 11, 2017 (JP) .................. 2017-094769

(51) Int. Cl.
| | |
|---|---|
| *H04L 29/06* | (2006.01) |
| *H04L 9/08* | (2006.01) |
| *H04L 9/32* | (2006.01) |
| *H04W 12/06* | (2021.01) |
| *H04W 84/12* | (2009.01) |

(52) U.S. Cl.
CPC ........ *H04L 63/0823* (2013.01); *H04L 9/0891* (2013.01); *H04L 9/321* (2013.01); *H04L 9/3263* (2013.01); *H04L 9/3265* (2013.01); *H04L 63/0442* (2013.01); *H04W 12/06* (2013.01); *H04L 29/06965* (2013.01); *H04L 63/166* (2013.01); *H04L 2209/80* (2013.01); *H04W 84/12* (2013.01)

(58) Field of Classification Search
CPC ............. H04L 63/0823; H04L 63/0442; H04L 63/166; H04L 9/0891; H04L 9/321; H04L 9/3263; H04L 9/3265; H04L 29/06965; H04L 2209/80; H04W 12/06
See application file for complete search history.

(56) References Cited

U.S. PATENT DOCUMENTS

| | | | | |
|---|---|---|---|---|
| 2006/0161644 | A1* | 7/2006 | Adelman | .......... H04L 29/12066 709/222 |
| 2016/0254916 | A1* | 9/2016 | Miyake | ................. H04L 9/3263 713/175 |

FOREIGN PATENT DOCUMENTS

| | | |
|---|---|---|
| JP | 2016163154 A | 9/2016 |
| JP | 20161663154 A | 9/2016 |

* cited by examiner

*Primary Examiner* — Joseph P Hirl
*Assistant Examiner* — Chi D Nguy
(74) *Attorney, Agent, or Firm* — Venable LLP

(57) ABSTRACT

The object of the present invention is to reduce the storage capacity necessary to save server certificates while enabling encrypted communication, such as SSL communication, whose convenience is high in the case where a plurality of server certificates is created. The present invention is a server that creates a server certificate that is necessary for encrypted communication and has a creation unit configured to create a first server certificate including information that fluctuates in accordance with a network environment, a second server certificate including information that does not fluctuate in accordance with the network environment, and a third server certificate that puts together information on a plurality of host names of the server, which a user can change and a transmission unit configured to transmit one of the created first, second, and third server certificates to a communication device.

20 Claims, 11 Drawing Sheets

SERVER, CONTROL METHOD OF SERVER, AND STORAGE MEDIUM

BACKGROUND OF THE INVENTION

Field of the Invention

The present invention relates to a technique of encrypted communication.

Description of the Related Art

In recent years, the use of SSL (Secure Sockets Layer) communication using a certificate is increasing in a network environment. In a built-in apparatus, such as a multifunction printer, the use of SSL communication is also increasing at the time of checking the state and performing secure printing. Generally, the SSL communication is established by a client that makes a request for encrypted communication and a server that receives the request and there is a mechanism for a client to verify a server certificate that is sent from a server to secure safe SSL communication.

As one of such mechanisms, it is known to use SNI (Server Name Indication) in Client Hello that is a request for the start of SSL communication, which a client transmits to a server. The client notifies the server of a host name that the client desires to access by using the SNI and the server determines which server certificate to use and sends a server certificate corresponding to the host name to the client An apparatus that provides network services supports various kinds of OS and various communication protocols in order to implement device discovery from a terminal. Specifically, DDNS (Dynamic Domain Name System), mDNS (multicast DNS), Bonjour, LLMNR (Link Local Multicast Name Resolution), and so on, are supported. There is a case where the host names of these protocols are different for different protocols. Other than the host name, an IP address is used to identify a device on a network.

That is, there is a possibility that a client on a network accesses a server by using the host name or the IP address of various protocols. In the case where a client uses the SNI at the time of accessing a server, the host name or the IP address of one of various protocols is specified, but it is necessary for the server to transmit a server certificate corresponding to the specified host name or IP address to the client. In the case where a corresponding server certificate is not transmitted, there is a possibility that the chance of SSL communication is lost because the client determines that safe encrypted communication cannot be performed.

Japanese Patent Laid-Open No. 2016-163154 has disclosed that a communication device including a plurality of interfaces creates a server certificate corresponding to each of the plurality of interfaces and a server certificate that is used is varied so as to suit an interface that is used.

SUMMARY OF THE INVENTION

In Japanese Patent Laid-Open No. 2016-163154, a plurality of server certificates is created, but in the case where the number of server certificate to be created increases, the storage capacity necessary to save the server certificates increases. That is, Japanese Patent Laid-Open No. 2016-163154 has not taken into consideration the problem that is caused by creating a plurality of server certificates.

In view of the above-described problem, an object of the present invention is to reduce the storage capacity necessary to save server certificates while enabling encrypted communication, such as SSL communication, whose convenience is high in the case where a plurality of server certificates is created.

The present invention is a server that creates a server certificate that is necessary for encrypted communication and has a creation unit configured to create a first server certificate including information that fluctuates in accordance with a network environment, a second server certificate including information that does not fluctuate in accordance with the network environment, and a third server certificate that puts together information on a plurality of host names of the server, which a user can change and a transmission unit configured to transmit one of the created first, second, and third server certificates to a communication device.

Further features of the present invention will become apparent from the following description of exemplary embodiments with reference to the attached drawings.

DESCRIPTION OF THE EMBODIMENTS

In the following, with reference to the drawings, an embodiment of the present invention is illustratively explained in detail. However, the relative arrangement of components, display screens, and so on, described below are not intended to limit the scope of the invention to those unless particularly described.

<About Configuration of System>

Figure 1:
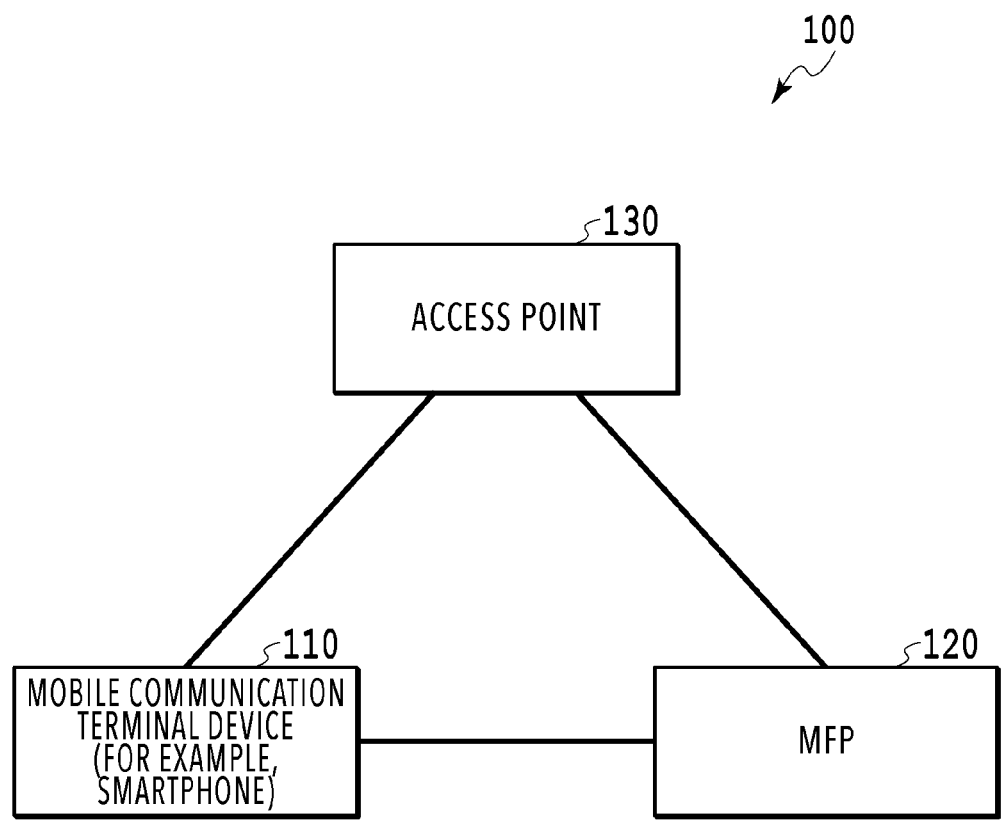
FIG. 1 is a block diagram showing a configuration of a wireless communication system.

In the following, a configuration of a wireless communication system in the present embodiment is explained by using FIG. 1. As shown in FIG. 1, a wireless communication system 100 in the present embodiment includes a mobile communication terminal device 110, a multifunction printer (hereinafter, MFP) 120, and an external access point 130.

The mobile communication terminal device 110 is a device having a wireless LAN (hereinafter, WLAN) communication unit configured to perform WLAN communication. As the mobile communication terminal device 110, it may also be possible to use a personal information terminal, such as a PDA (Personal Digital Assistant), a mobile telephone, a digital camera, and so on. The MFP 120 is required only to be capable of wireless communication with the mobile communication terminal device 110 and may have a read (scan) function, a FAX function, a telephone function, and so on, in addition to the print function. In the following, a case is shown where an MFP having the read function and the print function is used as the MFP 120. The external access point 130 has a WLAN communication unit configured to perform WLAN communication and provides communication in an infrastructure mode by relaying communication between devices permitted to connect to the access point. The infrastructure mode is one of the methods of establishing wireless connection with a device on the communication partner side via an external access point outside the MFP 120 (corresponds to the server in the present embodiment) and also outside the mobile communication terminal device 110 that is the communication partner device.

Between the mobile communication terminal device 110 and the MFP 120, it may also be possible to perform wireless communication in the infrastructure mode via the external access point 130 by the WLAN communication unit possessed by each. Alternatively, it may also be possible to perform P2P communication in a Wi-Fi Direct mode (hereinafter, WFD) and the like without using the external access point 130 by the WLAN communication unit possessed by each. It is possible for a device compatible with the WFD to operate as an access point (GroupOwner) by itself and due to this, it is made possible to establish direct wireless communication with the device on the partner side. At this time, which of the device on the partner side and the device on this side operates as an access point is determined by a sequence called GroupOwnerNegotiation. Due to this, the conventional access point dedicated device is no longer necessary and direct connection between devices is implemented. It is possible for the mobile communication terminal device 110 and the MFP 120 to perform processing in accordance with various printing services via the WLAN. That is, in the case where the mobile communication terminal device 110 and the MFP 120 perform wireless communication in the WFD mode, wireless communication is performed without using the above-described external access point 130.

Here, explanation is given by taking a system including a mobile communication terminal device and an MFP as an example, but the device that is used is not limited to the mobile communication terminal device or the MFP and it is possible to apply the present invention to any system including a server, a client, and an access point.

<About Mobile Communication Terminal Device>

Figure 2:
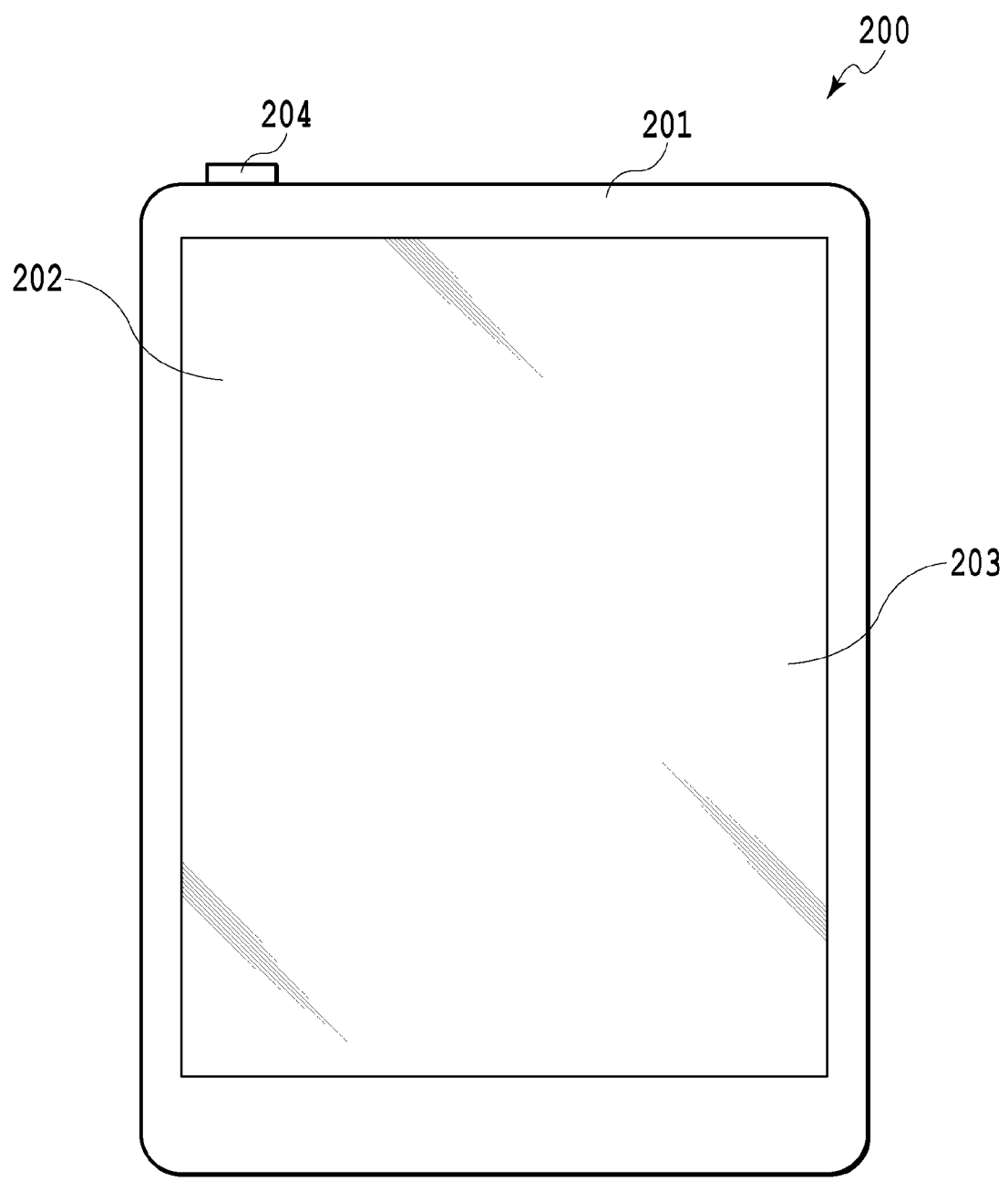
FIG. 2 is a diagram showing an external appearance of a mobile communication terminal device.

In the following, an external appearance of the mobile communication terminal device 110 in the present embodiment is explained by using FIG. 2. In the following, a case is shown where a smartphone is used as the mobile communication terminal device 110. A smartphone is a multifunction mobile telephone having a camera function, a web browser function, an email function, and so on, in addition to the function as a mobile telephone.

A WLAN unit 201 is a unit configured to perform communication via the WLAN embedded inside a smartphone 200 and is a unit configured to perform wireless communication in the WFD mode, a software AP mode (parent device mode), the infrastructure mode, and so on. It is assumed that the WLAN unit 201 is capable of packet communication in a WLAN system in conformity with, for example, the IEEE 802.11 series. A display unit 202 is, for example, a display including an LCD display mechanism. An operation unit 203 includes a touch panel operation mechanism and detects an operation by a user. As a representative operation method, a method of detecting an operation event by displaying a button icon, a software keyboard, and so on, on the display unit 202 and by a user touching the portion is known. Here, a case is shown where the display unit and the operation unit are made up integrally, but the display unit and the operation unit may be made up separately. A power source button 204 is a button that is pressed down at the time of turning on the power source or turning off the power source.

<About Configuration of Smartphone>

Figure 3:
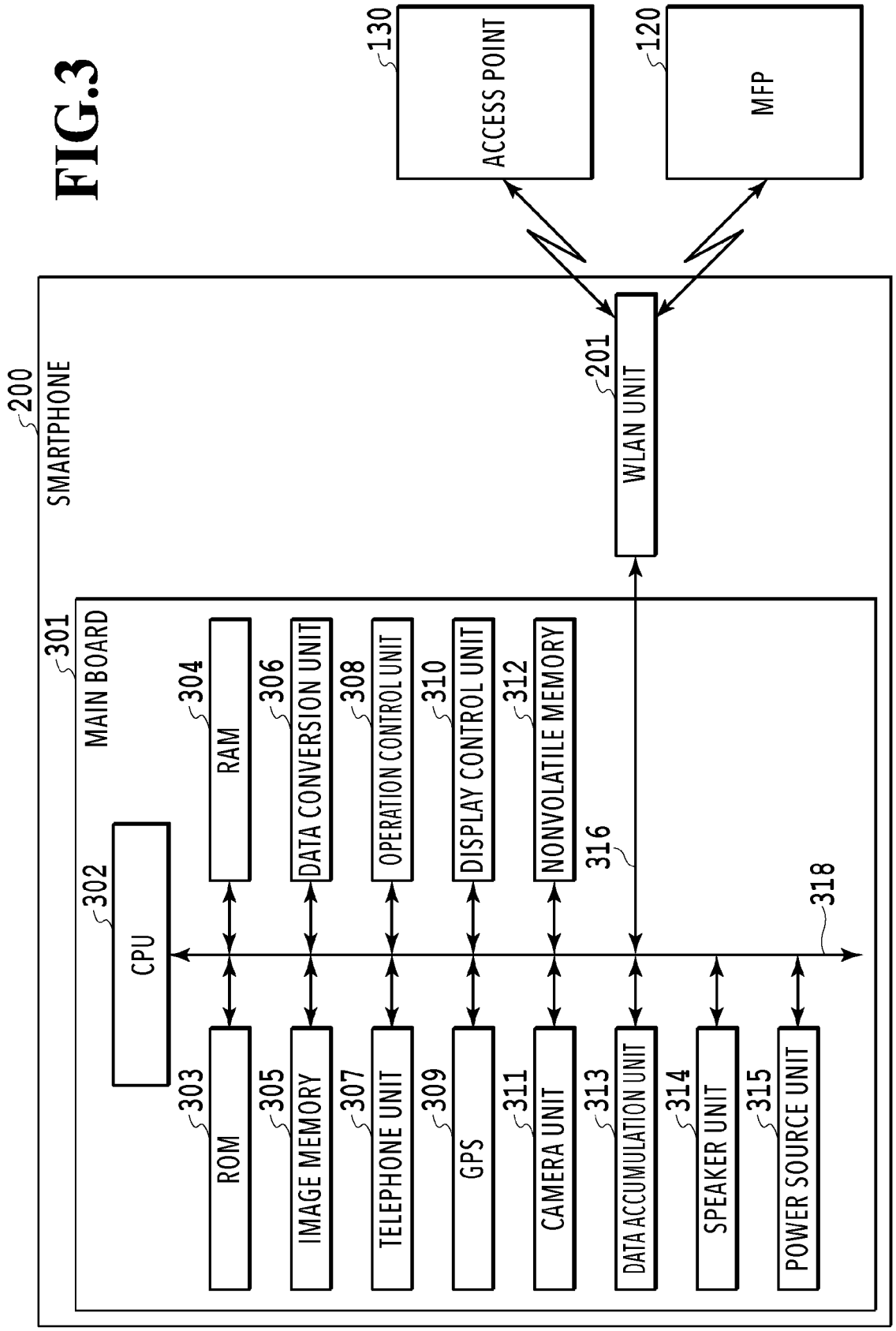
FIG. 3 is a block diagram showing a configuration of a smartphone.

In the following, a configuration of the smartphone 200 in the present embodiment is explained by using FIG. 3. The smartphone 200 has a main board 301 that performs main control of the smartphone 200 itself and the WLAN unit 201 configured to perform WLAN communication.

A CPU 302 centralizedly controls the entire operation of the smartphone 200. Specifically, the CPU 302 performs various kinds of processing by loading programs saved in a ROM 303 onto a RAM 304 and executing the loaded programs.

In the ROM 303, data, such as control programs and a built-in operating system (OS) program executed by the CPU 302, is saved. In the present embodiment, under the management of the built-in OS saved in the ROM 303, in accordance with each control program saved in the ROM 303, software control, such as scheduling and task switch, is performed. The RAM 304 includes an SRAM (Static RAM) and the like and in the RAM 304, program control variables, setting values that are input by a user, data, such as management data of the smartphone 200, are saved. Further, in the RAM 304, buffer areas for various works are provided.

An image memory 305 includes a memory, such as a DRAM (Dynamic RAM), and temporarily saves image data to be processed by the CPU 302. This image data includes image data received via the WLAN unit 201, image data read from a data accumulation unit 313, and so on. A nonvolatile memory 312 includes a memory, such as a flash memory, and data that is saved in the nonvolatile 312 continues to be kept without being deleted even in the case where the power source of the smartphone 200 turns off.

The memory configuration is not limited to that described above. For example, in FIG. 3, the RAM 304 and the image memory 305 are shown as separate components, but it may also be possible to implement the RAM and the image memory by causing them to share one memory. Further, it may also be possible to perform backup of data and the like by using the data accumulation unit 313. Furthermore, in the above-described example, the image memory 305 is implemented by using a DRAM, but it may also be possible to implement the image memory 305 by using another storage medium, such as a hard disk and a nonvolatile memory.

A data conversion unit 306 analyzes data in various formats and performs data conversion, such as color conversion and image conversion. A telephone unit 307 implements communication by a telephone by performing control of a telephone line and processing voice data that is input and output via a speaker unit 314. An operation control unit 308 performs control based on a signal that is input via the operation unit 203. A GPS (Global Positioning System) 309 acquires position information, such as the current latitude and longitude of the smartphone 200. A display control unit 310 electrically controls contents that are displayed on the display unit 202 and causes the display unit 202 to display a message and the like indicating information on keys to perform various inputs, the operation situation of the MFP 120, the status situation, and so on.

A camera unit 311 has a function to electrically record an image that is input via a lens and to encode the image. Image data acquired by performing capturing by using the camera unit 311 is saved in the data accumulation unit 313. The speaker unit 314 implements a function to input or output voice data for the telephone function and another voice function, such as alarm notification. A power source unit 315 includes a portable battery and the like and controls power supply to each component within the smartphone 200. In the present embodiment, it is assumed that the smartphone 200 enters one of the following four power source states. The four power source states are, namely a state where the battery remaining amount is zero (dead battery state), a state where the power source is not on (power source off state), an activation state into which the power source off state makes a transition by normal activation with the power source button 204 being pressed down (power source on state), and an activated state where power is saved (power-saving state).

The WLAN unit 201 is a unit configured to implement WLAN communication in conformity with the standard and is connected to the main board 301 via a bus cable 316. It is possible for the smartphone 200 to perform WLAN communication by using the WLAN unit 201, and thereby, the smartphone 200 performs data communication with another device, such as the MFP 120. The WLAN unit 201 converts data into a packet and transmits the converted packet to another external device and at the same time, receives a packet transmitted from another external device, and restores the received packet to the original data and transmits the data to the CPU 302.

Each component within the main board 301 and the WLAN unit 201 are connected to each other via a system bus 318 managed by the CPU 302 and it is possible to perform transmission and reception of data therebetween.

<About External Appearance of MFP>

Figure 4:
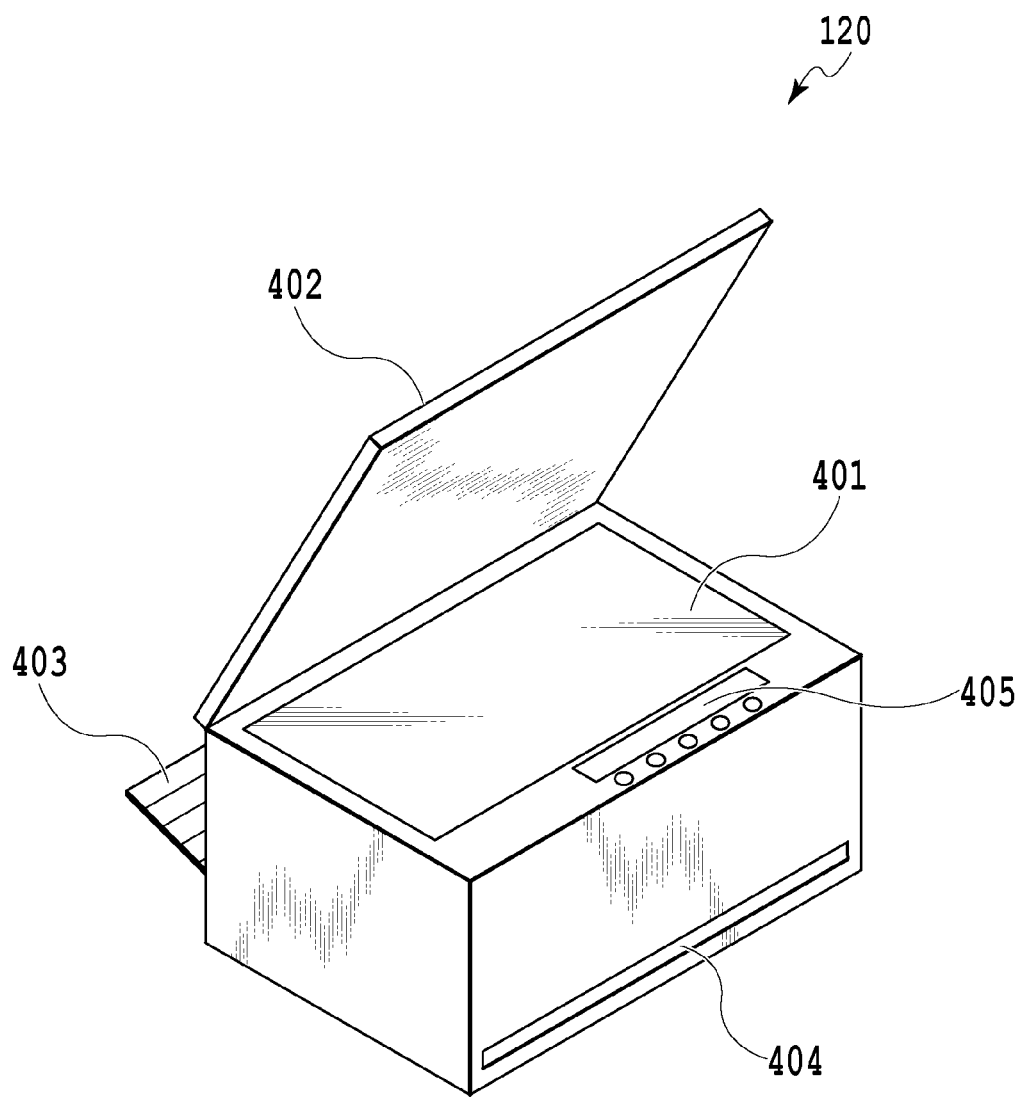
FIG. 4 is a diagram showing an external appearance of an MFP.

In the following, the external appearance of the MFP 120 in the present embodiment is explained by using FIG. 4. A document table 401 is a transparent table made of glass on which to place a document that is read by a reading unit (scanner) 509 (see FIG. 5). A document lid 402 is a lid for pressing down a document at the time of the reading unit 509 reading the document and for preventing light from the light source with which a document is irradiated at the time of reading from leaking to the outside. An insertion port 403 is an insertion port at which printing media, such as printing sheets, of various sizes can be set. The recording media set at the insertion port 403 are conveyed to a printing unit 512 (see FIG. 5) one by one and after printing is performed at the printing unit 512, the printing medium is discharged from a discharge port 404.

An operation display unit 405 includes operation parts, such as a character input key, a cursor key, a determination key, and a cancellation key, and display parts, such as an LED (Light Emitting Diode) and an LCD (Liquid Crystal Display). Alternatively, the operation display unit 405 may include a touch panel. The operation display unit 405 receives an operation from a user and at the same time, presents information to a user by displaying a message and the like indicating the operation situation of the MFP 120. It is possible for a user to make use of various functions of the MFP 120 and to perform various settings via the operation display unit 405.

<About Configuration of MFP>

Figure 5:
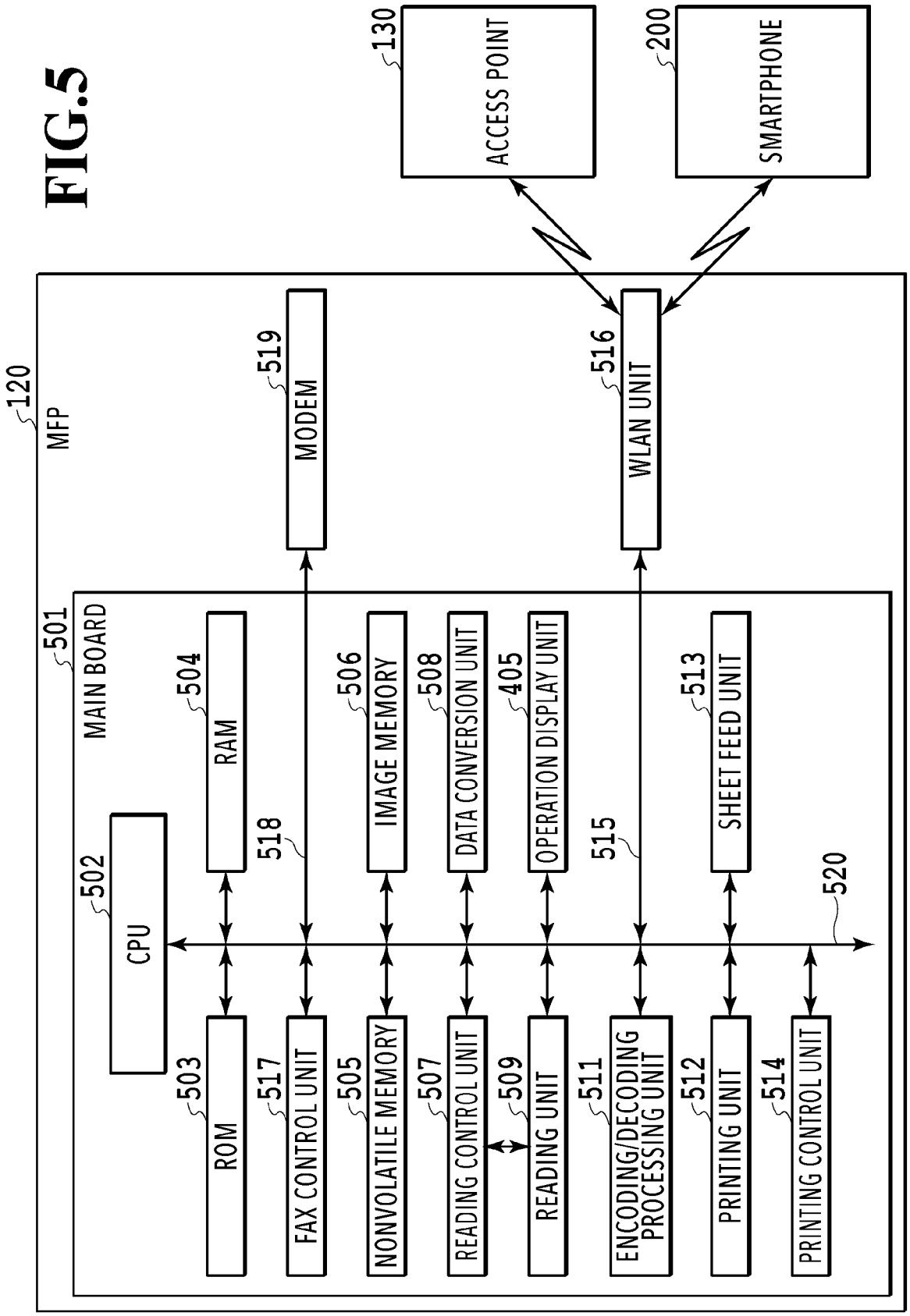
FIG. 5 is a block diagram showing a configuration of the MFP.

In the following, the configuration of the MFP 120 in the present embodiment is explained by using FIG. 5. The MFP 120 has a main board 501 that performs main control of the MFP 120 itself, a WLAN unit 516 configured to perform WLAN communication, and a modem 519.

A CPU 502 centralizedly controls the operation of the entire MFP 120. Specifically, the CPU 502 performs various kinds of processing, for example, processing in FIG. 7, FIG. 8, FIG. 10, and FIG. 11, to be described later, by loading programs saved in a ROM 503 onto a RAM 504 and executing the loaded programs.

In the ROM 503, data, such as control programs and a built-in operating system (OS) program executed by the CPU 502, is saved. In the present embodiment, under the management of the built-in OS saved in the ROM 503, in accordance with each control program saved in the ROM 503, software control, such as scheduling and task switch, is performed. The RAM 504 includes an SRAM (Static RAM) and the like and in the RAM 504, program control variables, setting values that are input by a user, data, such as management data of the MFP 120, are saved. Further, in the RAM 504, buffer areas for various works are provided. A nonvolatile memory 505 includes a memory, such as a flash memory, and data that is saved in the nonvolatile memory 505 continues to be kept without being deleted even in the case where the power source of the MFP 120 turns off. An image memory 506 includes a memory, such as a DRAM (Dynamic RAM). The image memory 506 is a memory for temporarily saving image data and the image data that is saved in the image memory 506 includes image data received via the WLAN unit 516, image data processed by an encoding/decoding processing unit 511, and so on. Like the memory configuration of the smartphone 200, the memory configuration of the MFP 120 is not necessarily limited to that explained here.

A data conversion unit 508 analyzes data in various formats and performs data conversion, such as conversion from image data into print data. A reading control unit 507 converts the intensity of light acquired by controlling the reading unit 509 including a contact image sensor (CIS) and the like and optically reading an image on a document into an electric signal and outputs the electric signal.

The operation display unit 405 receives an operation from a user and at the same time, displays a message and the like indicating the operation situation of the MFP 120. The encoding/decoding processing unit 511 performs encoding processing, decoding processing, enlargement processing, reduction processing, and so on, for image data that is handled by the MFP 120. A sheet feed unit 513 holds printing media, such as printing sheets, and a printing control unit 514 controls the sheet feed unit 513 and feeds the printing medium that is held in the sheet feed unit 513 to the printing unit 512. In order to hold a plurality of kinds of sheet in one MFP, it may also be possible for the MFP to have a plurality of sheet feed units and for the printing control unit 514 to control which sheet feed unit a sheet is fed from.

The printing control unit 514 performs various kinds of image processing, such as smoothing processing, density correction processing, and color correction processing, for image data and outputs print data after the image processing to the printing unit 512. The printing unit 512 performs printing based on the print data transmitted from the printing control unit 514. For example, in the case where the MFP 120 is an ink jet printer, the printing unit 512 performs printing by ejecting ink that is supplied from the ink tank from the print head. Further, the printing control unit 514 also plays a role to update information that is saved in the RAM 504 by periodically reading information on the printing unit 512. For example, in the case where the MFP 120 is an ink jet printer, the printing control unit 514 updates status information on the remaining amount in the ink tank, the state of the print head, and so on.

Further, on the MFP 120, like the smartphone 200, the WLAN unit 516 is mounted. The WLAN unit 516 including an antenna and the like for performing communication by the WLAN has a function equivalent to that of the WLAN unit 201 of the smartphone 200 and is connected to the main board 501 via the bus cable 515. It is possible for the smartphone 200 and the MFP 120 to perform communication based on the WFD and both have a software access point (SoftAP) function.

Each component within the main board 501 is connected to one another via the system bus 520 managed by the CPU 502 and can perform transmission and reception of data therebetween.

<About User Interface of MFP>

Figure 6A:
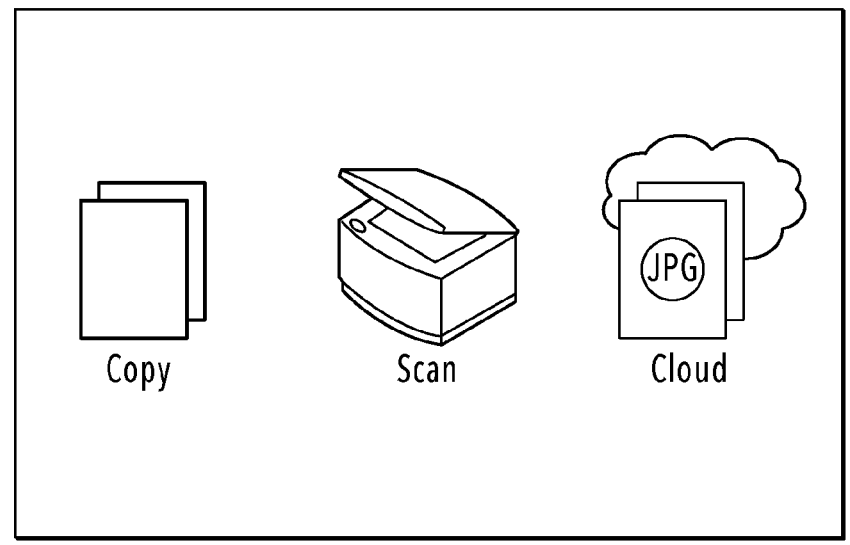
FIG. 6A, FIG. 6B, and FIG. 6C are each a diagram schematically showing a user interface.
Figure 6B:
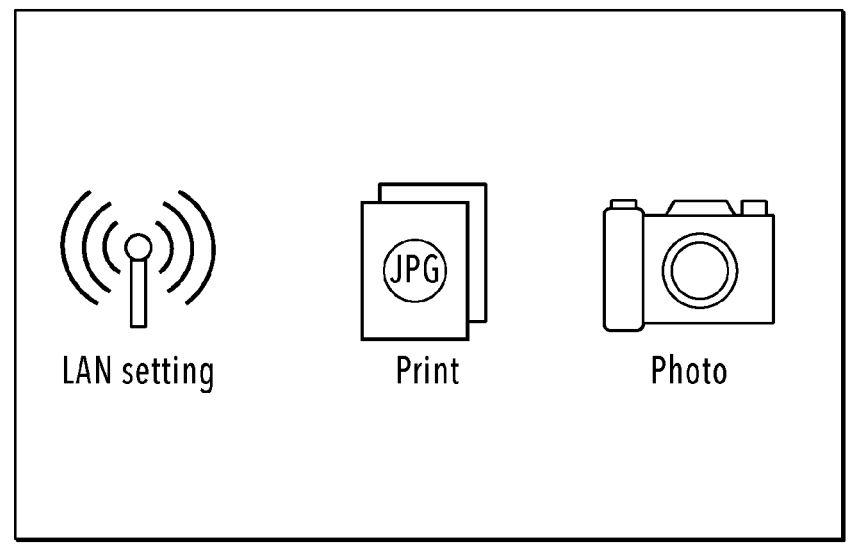
Figure 6C:
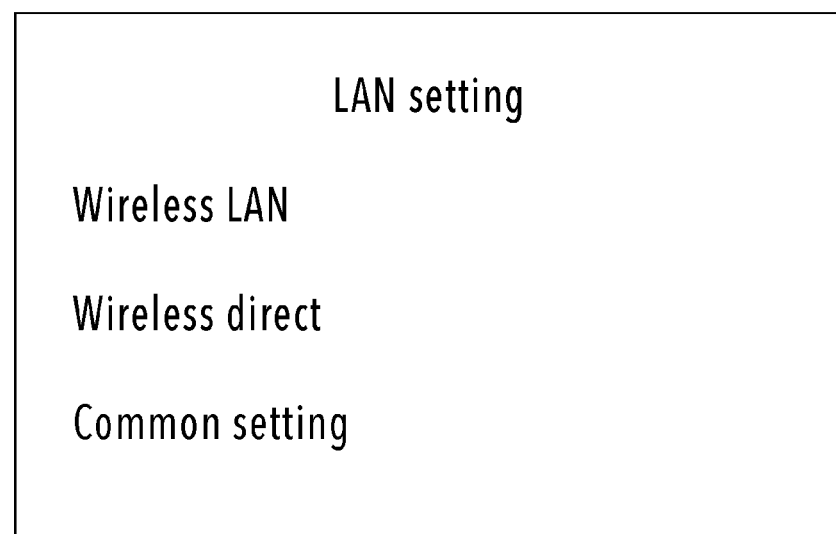

FIG. 6A to FIG. 6C are each a diagram schematically showing an example of a user interface (hereinafter, UI) that is displayed on the operation display unit 405 of the MFP 120. FIG. 6A is a home screen that is displayed in an idle state where the power source of the MFP 120 is on but an operation, such as printing and reading (scan), is not performed. It is possible for a use who sees the home screen in FIG. 6A to make use of the copy function, the read (scan) function, or the cloud function by selecting one of icons. FIG. 6B is a screen that is displayed seamlessly by a user performing a key operation or a touch panel operation in the state where the home screen in FIG. 6A is displayed. On the screen in FIG. 6B, icons that are selected at the time of making use of functions different from the functions that are selected on the home screen in FIG. 6A, that is, a print function and a photo function, and an icon that is selected at the time of performing LAN setting are displayed. FIG. 6C is a UI that is displayed in the case where the icon of LAN setting is selected on the screen in FIG. 6B. It is possible for a user to change various settings relating to the LAN via this UI, such as whether to set the infrastructure mode effective or ineffective and whether to set the WFD mode effective or ineffective.

First Embodiment

In the present embodiment, processing of the MFP 120 to create a server certificate in order to enable SSL communication and usage of the created server certificate in the MFP 120 at the time of the start of SSL communication are explained. It is assumed that the MFP 120 in the present embodiment performs communication by acquiring an IP address from a DHCP server in the infrastructure mode and performs communication with a fixed IP address as an owner in the WFD mode. Further, it is assumed that the MFP 120 has the host names of the Bonjour protocol, the LLMNR protocol, and the DDNS protocol capable of name resolution in various discovery protocols in common in the infrastructure mode and the WFD mode. That is, for example, the host name that is used in the case where device discovery is made in the infrastructure mode and the host name that is used in the case where device discovery is made in the WFD mode are a common host name.

<About SSL Communication Enabling Processing>

Figure 7:
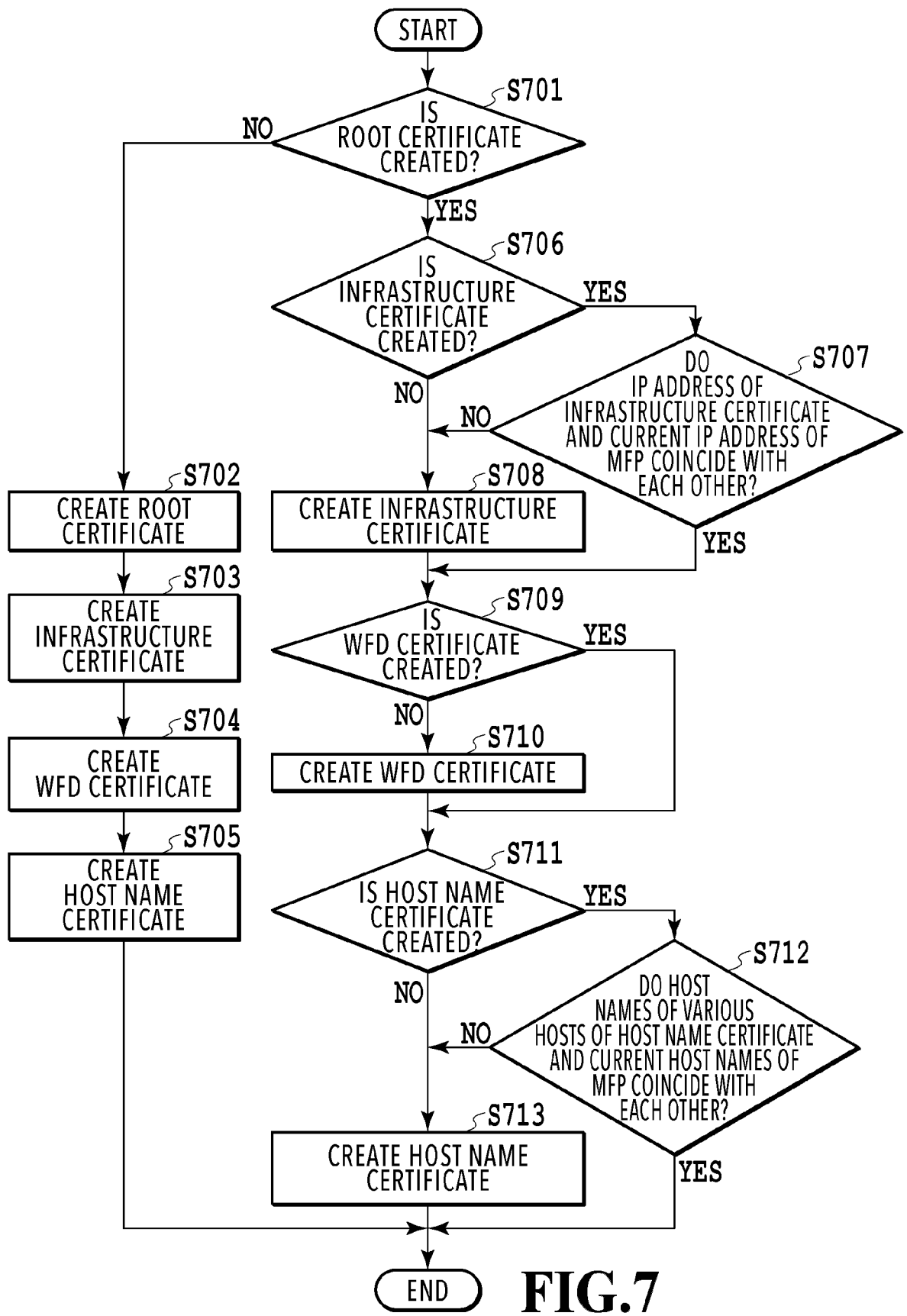
FIG. 7 is a flowchart of SSL communication enabling processing in a first embodiment.

In the following, processing to enable SSL communication (SSL communication enabling processing) that is performed by the MFP 120 in the present embodiment is explained by using FIG. 7. FIG. 7 is a flowchart of the SSL communication enabling processing in the present embodiment. The SSL communication enabling processing shown below is started after the activation of the MFP 120, specifically, in the case where an IP address is determined and host names of the various protocols, such as Bonjour, LLMNR, and DDNS, are determined.

At step S701, whether an already-created root certificate is saved in the nonvolatile memory 505 is determined. In the case where the determination results at step S701 are affirmative, the processing advances to step S706. On the other hand, in the case where the determination results are negative, the processing advances to step S702.

First, the case where a root certificate is not created yet (NO at step S701) is explained. In this case, at step S702, a root certificate is created. Next, at step S703, a server certificate using an IP address in the infrastructure mode as a common name (hereinafter, called an infrastructure certificate) is created. Next, at step S704, a server certificate using an IP address in the WFD mode as a common name (hereinafter, called a WFD certificate) is created. Next, at step S705, a server certificate using host names of the protocols, such as Bonjour, LLMNR, and DDNS, as Subject Alternative Names (hereinafter, SANs) (hereinafter, called a host name certificate) is created. Details of certificate creation processing at each of step S702 to step S705 will be described later by using FIG. 8. As the protocols included in the host name certificate, mention is made of the above-described three protocols, but any protocol may be included in the host name certificate as long as a fixed host name is used unless a user changes the setting.

Following the above, the case where a root certificate is created (YES at step S701) is explained. In this case, at step S706, whether an infrastructure certificate is already created is determined. In the case where the determination results at step S706 are affirmative, the processing advances to step S707. On the other hand, in the case where the determination results are negative, the processing advances to step S708.

At step S707, the IP address described in the common name of the infrastructure certificate that is saved in the nonvolatile memory 505 is compared with the current IP address in the infrastructure mode of the MFP 120. Then, whether both the IP addresses coincide with each other is determined. In the case where the determination results at step S707 are affirmative (coincident), the processing advances to step S709. On the other hand, in the case where the determination results are negative (not coincident), the processing advances to step S708.

At step S708, an infrastructure certificate using the current IP address as a common name is created and the created infrastructure certificate is saved in the nonvolatile memory 505 by overwriting and the processing advances to step S709.

After the processing relating to the infrastructure certificate, at step S709, whether a WFD certificate is already created is determined. In the case where the determination results at step S709 are negative, a WFD certificate is created at step S710 and then the processing advances to step S711. On the other hand, in the case where the determination results are affirmative, the processing advances to step S711 without creating a WFD certificate.

After the processing relating to the WFD certificate, at step S711, whether a host name certificate is already created is determined. In the case where the determination results at step S711 are affirmative, the processing advances to step S712. On the other hand, in the case where the determination results are negative, the processing advances to step S713.

At step S712, the host names of Bonjour, LLMNR, and DDNS described in the SANs of the host name certificate saved in the nonvolatile memory 505 are compared with the current host names of Bonjour, LLMNR, and DDNS of the MFP 120. Then, whether all of the host names coincide with all of the corresponding host names with each other is determined. In the case where the determination results at step S712 are affirmative (all are coincident), the series of processing is terminated without creating a host name certificate. On the other hand, in the case where the determination results are negative (at least one is not coincident), the processing advances to step S713.

At step S713, a host name certificate describing the current host names of Bonjour, LLMNR, and DDNS of the MFP 120 in the SANs is created and the series of processing is terminated. The above is the contents of the SSL communication enabling processing in the present embodiment.

<About Certificate Creation Processing>

Figure 8:
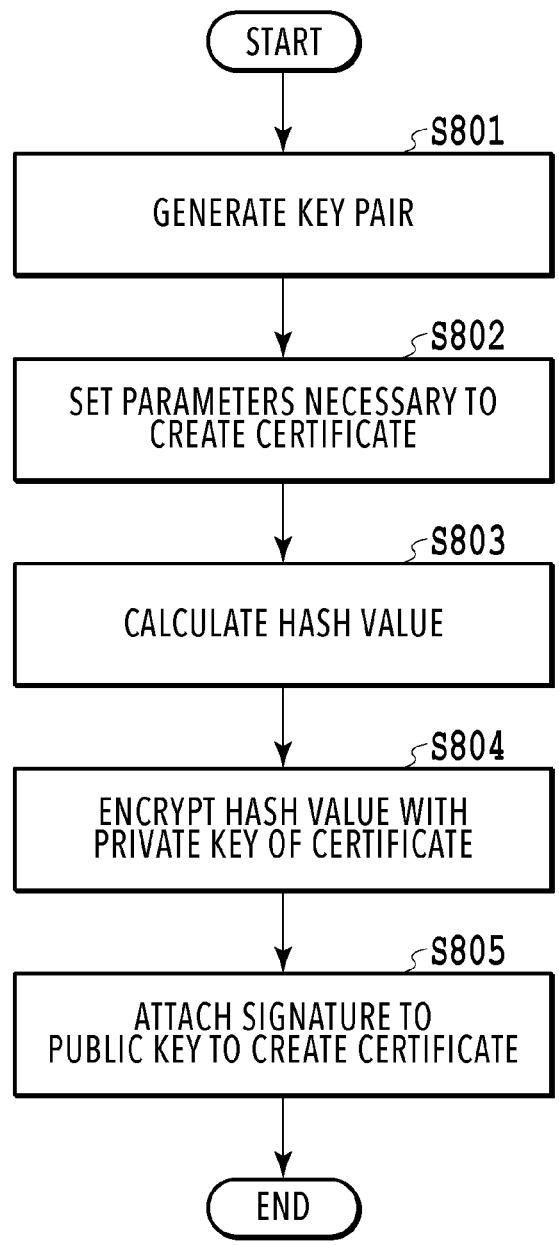
FIG. 8 is a flowchart of certificate creation processing in the first embodiment.

In the following, certificate creation processing (steps S702 to 705, S708, S710, S713 in FIG. 7) in the present embodiment is explained by using FIG. 8. FIG. 8 is a flowchart of the certificate creation processing in the present embodiment.

First, at step S801, a pair of a public key and a private key (key pair) used in the public key cryptosystem is generated. As the public key cryptosystem, it may also be possible to adopt any system, for example, such as the RSA cryptosystem and the elliptic curve cryptosystem (ECC).

Next, in order to make it possible to use the public key generated at step S801 as a certificate, necessary parameters are set at step S802. Here, the necessary parameters include the country name, the prefecture name, the city name, the organization name, the division name, the common name, the term of validity, the cryptosystem, the subject alternative name, and so on.

Next, at step S803, a hash value is calculated by using the hash algorithm, such as the SHA-256.

Next, at step S804, signing is performed by encrypting the hash value calculated at step S803 with the private key of the certificate. The certificate that is used for signing at step S804 is varied so as to suit a certificate to be created. Specifically, in the case where a root certificate is created, signing is performed with the private key that makes a pair with the public key generated at step S801. By doing so, it is possible to create a certificate whose issuer and subject are the same entity, a so-called self-signed certificate. This self-signed certificate is created at the time of the initial activation of the MFP 120 and saved in the nonvolatile memory 505 as the root certificate along with the private key (see FIG. 9). Further, in the case where a server certificate that is used for SSL communication is created, signing is performed with the private key of the root certificate by taking the root certificate created in advance for the public key generated at step S801 to be a higher certificate authority.

Figure 9:
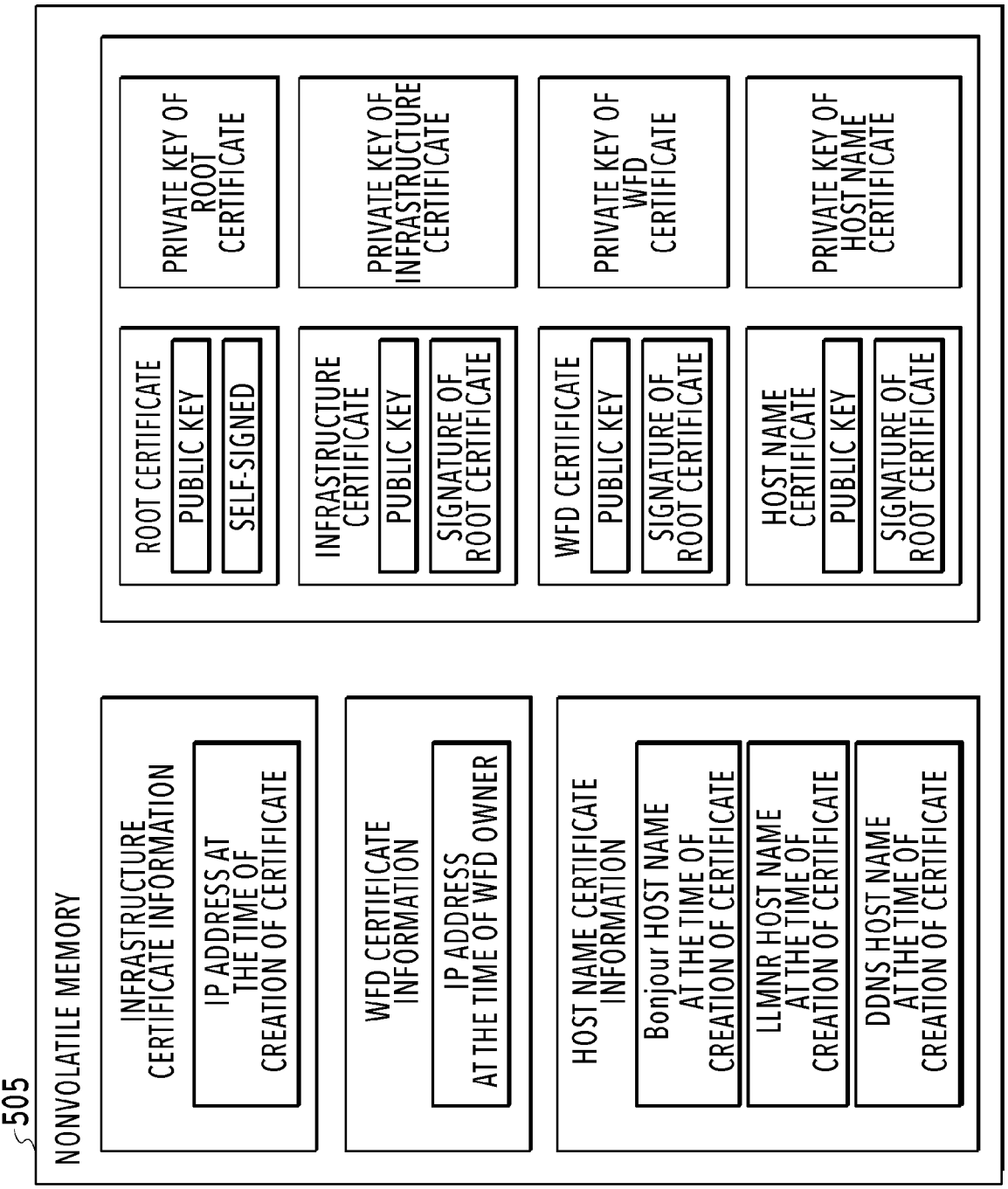
FIG. 9 is a diagram showing data that is saved in a nonvolatile memory of the MFP.

Finally, at step S805, the certificate is created by attaching signature information to the public key. As shown in FIG. 9, the certificate created in the certificate creation processing in the present embodiment is saved in the nonvolatile memory 505 by being made a pair with the private key of the certificate along with the information on the IP address and the host name at the time of creation of the certificate. The above is the contents of the certificate creation processing in the present embodiment.

As described previously, in the present embodiment, in the case where the root certificate is not created (NO at step S701), even though the infrastructure certificate, the WFD certificate, and the host name certificate are created, they are not used but those signed with the private key of a root certificate newly created are used. Because of this, these three server certificates are re-created. On the other hand, in the case where the root certificate is created (YES at step S701), the private key that is used for signing is the same, and therefore, unless the information on the common name of the server certificate and the like is changed, it is not necessary to re-create these three server certificates.

<About Processing at the Time of Reception of SSL Communication Request>

Figure 10:
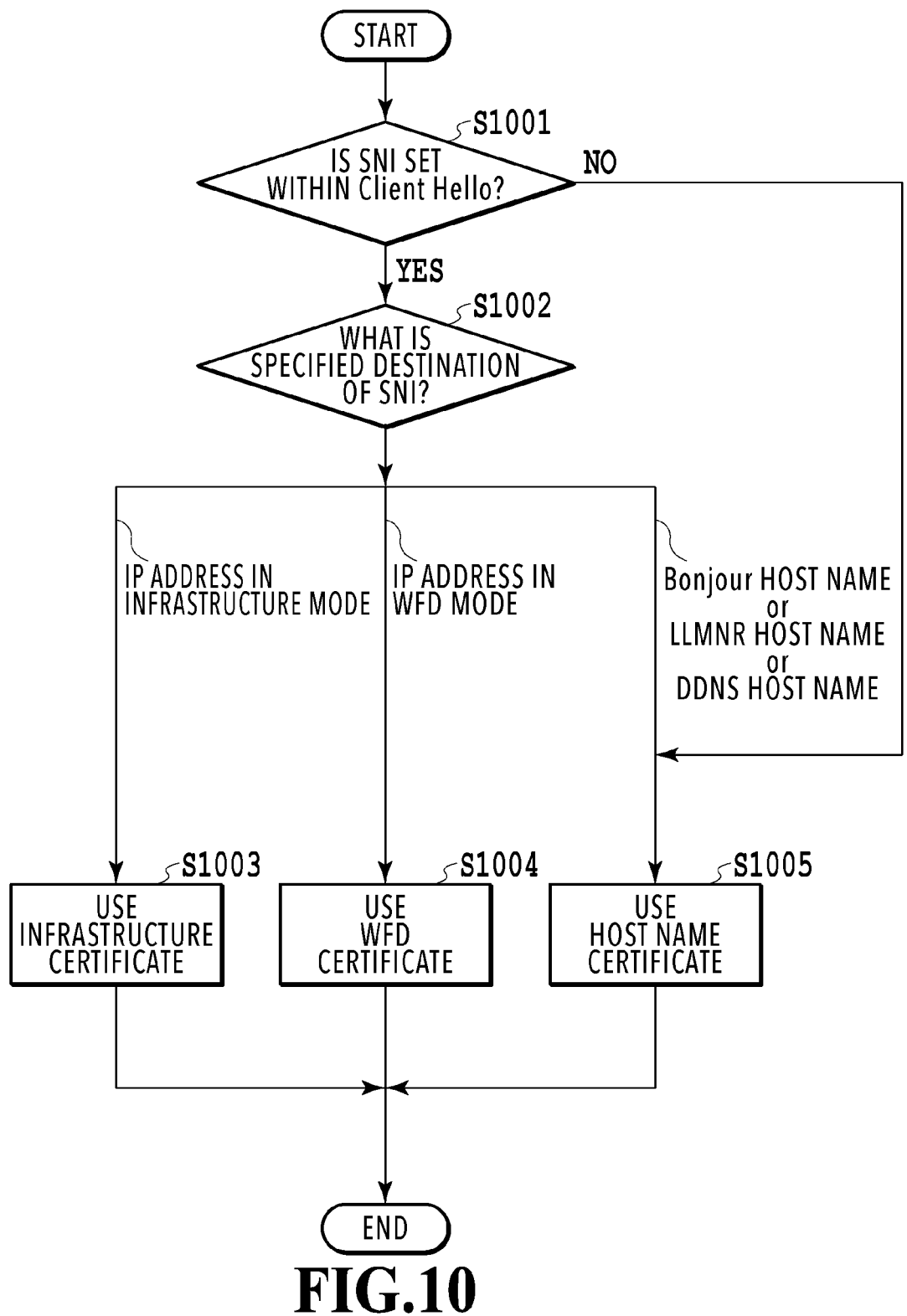
FIG. 10 is a flowchart of processing that is performed by the MFP at the time of reception of an SSL communication request in the first embodiment.

In the following, processing at the time of reception of an SSL communication request in the present embodiment is explained by using FIG. 10. FIG. 10 is a flowchart of processing that is performed by the MFP 120 in the case where the MFP 120 receives an SSL communication request transmitted from the smartphone 200. This processing is started in the case where the MFP 120 receives Client Hello, which is an SSL communication request. In the case where a certificate is being created, it is not possible for the MFP 120 of the present embodiment to use the certificate being created. For example, in the case where the specified destination of the SNI is the IP address in the infrastructure mode, the MFP 120 uses the infrastructure certificate, as will be described later. However, in the case where the infrastructure certificate is being created at S703 or S708, the MFP 120 cannot use the infrastructure certificate, and therefore, SSL communication is not performed.

First, at step S1001, whether the SNI is set within the received Client Hello is determined. In the case where the determination results at step S1001 are affirmative, the processing advances to step S1002. On the other hand, in the case where the determination results are negative, the processing advances to step S1005.

In the case where the SNI is set within the Client Hello (YES at step S1001), what is the specified destination of the SNI is determined at step S1002. In the case where the results of the determination indicate that the specified destination of the SNI is the IP address in the infrastructure mode, the processing advances to step S1003. In the case where the specified destination of the SNI is the IP address in the WFD mode, the processing advances to step S1004. In the case where the specified destination of the SNI is one of the host names of Bonjour, LLMNR, and DDNS, the processing advances to step S1005.

In the case where the specified destination of the SNI is the IP address in the infrastructure mode, at step S1003, the infrastructure certificate is used, that is, the infrastructure certificate is transmitted to the smartphone 200.

In the case where the specified destination of the SNI is the IP address in the WFD mode, at step S1004, the WFD certificate is used, that is, the WFD certificate is transmitted to the smartphone 200.

In the case where the SNI is not set (NO at step S1001), or the specified destination of the SNI is one of the host names of Bonjour, LLMNR, and DDNS, at step S1005, the host name certificate is used, that is, the host name certificate is transmitted to the smartphone 200. The above is the contents of the processing that is performed by the MFP 120 at the time of reception of an SSL communication request. The case where SSL communication is made use of as encrypted communication is explained so far, but it is also possible to apply the present embodiment to another encrypted communication, such as TLS (Transport Layer Security) communication.

<About Effects and the Like of the Present Embodiment>

As described above, in the present embodiment, the MFP 120 creates and manages three server certificates (that is, infrastructure certificate, WFD certificate, host name certificate). Due to this, even in the case where the apparatus, such as the MFP 120, which receives an SSL communication request transmitted from the mobile communication terminal device 110, such as the smartphone 200, has low specifications, it is possible to prevent the chance of SSL communication from being reduced wherever possible. The reason is as follows.

The infrastructure certificate includes information that fluctuates in accordance with the network environment, and therefore, the frequency of re-creation is high compared to the WFD certificate and the host name certificate. Then, for the apparatus having low specifications, a case is supposed where creation of the infrastructure certificate takes time, but in the present embodiment, while the infrastructure certificate is being created, SSL communication making use of the WFD certificate or SSL communication making use of the host name certificate is possible. On the other hand, in the case where a user changes the host name via the operation display unit 405 and the like, the host name certificate is re-created, but in the present embodiment, while the host name certificate is being re-created also, SSL communication making use of the infrastructure certificate or the WFD certificate is possible. That is, the MFP 120 manages the infrastructure certificate, the WFD certificate, and the host name certificate individually, and therefore, it is possible to perform SSL communication using another certificate different from the certificate being created. As a result of this, it is possible to obtain the effect that the chance of SSL communication is not reduced wherever possible.

Further, on the other hand, while operating in the WFD mode, the MFP 120 always operates with a fixed IP address as an owner, and therefore, it is possible to handle the WFD certificate as a certificate that does not need to be changed. Furthermore, in the present embodiment, the three server certificates are saved in the nonvolatile memory 505 (see FIG. 9), and therefore, in the case where the printer is turned off and then turned on again, it is possible to make use of the certificate created previously as it is. Still furthermore, the host name certificate includes only information that a user can change arbitrarily, not information that fluctuates in accordance with the network environment, and therefore, it is not necessary to re-create the host name certificate in the case where the network environment changes. In the present embodiment, a plurality of host names is described in the SANs, but it may also be possible to further describe information on one of the plurality of host names as a common name.

Only in the case of the host name certificate in the present embodiment, the host name certificate integrated into one so as to be compatible with a plurality of protocols is created. As a result of this, it is possible to reduce the amount of consumption of the storage capacity in the server compared to the case where the certificate of the Bonjour protocol, the certificate of the LLMNR protocol, and the certificate of the DDNS protocol described above are created separately.

Further, in the present embodiment, the three server certificates are signed with the same root certificate and due to this, the security at a certain level in SSL communication is secured. Originally, the self-signed certificate is not a certificate signed by the regular certificate authority, and therefore, there is such a problem that the mobile communication terminal device 110, which is an SSL client, determines that the certificate is not a reliable certificate. In order to deal with this problem, it is sufficient to import the self-signed certificate to the mobile communication terminal device 110 as a reliable certificate, but it is troublesome to import the self-signed certificate each time the server certificate is re-created. Consequently, in the present embodiment, as described above, the three server certificates are signed with the root certificate. By doing so, only by importing the root certificate used for signing to the mobile communication terminal device 110, it is possible to secure security also in the case where the server certificate is re-created unless the root certificate is re-created.

Second Embodiment

In the first embodiment, the case is explained where a server certificate is created based on the creation state of a certificate (that is, whether or not a certificate is created) and the current setting information on the MFP 120 (that is, the current IP address, the current host name, and so on) (see FIG. 7), However, it is possible to start SSL communication earlier in the case where priority of the server certificate that is created based on the wireless connection system (so-called operation mode in the network) of the MFP 120 is determined. In the present embodiment, processing of the MFP 120 to sequentially create a plurality of kinds of server certificate in the order in accordance with the wireless connection system is explained. Specifically, the processing is processing to create a server certificate at the time of activation of the MFP 120 that operates in one of an infrastructure mode, a WFD mode, and a concurrent operation mode. The concurrent operation mode is a mode in which the MFP 120 operates both in the infrastructure mode and in the WFD mode.

<About Processing to Create Server Certificate>

Figure 11:
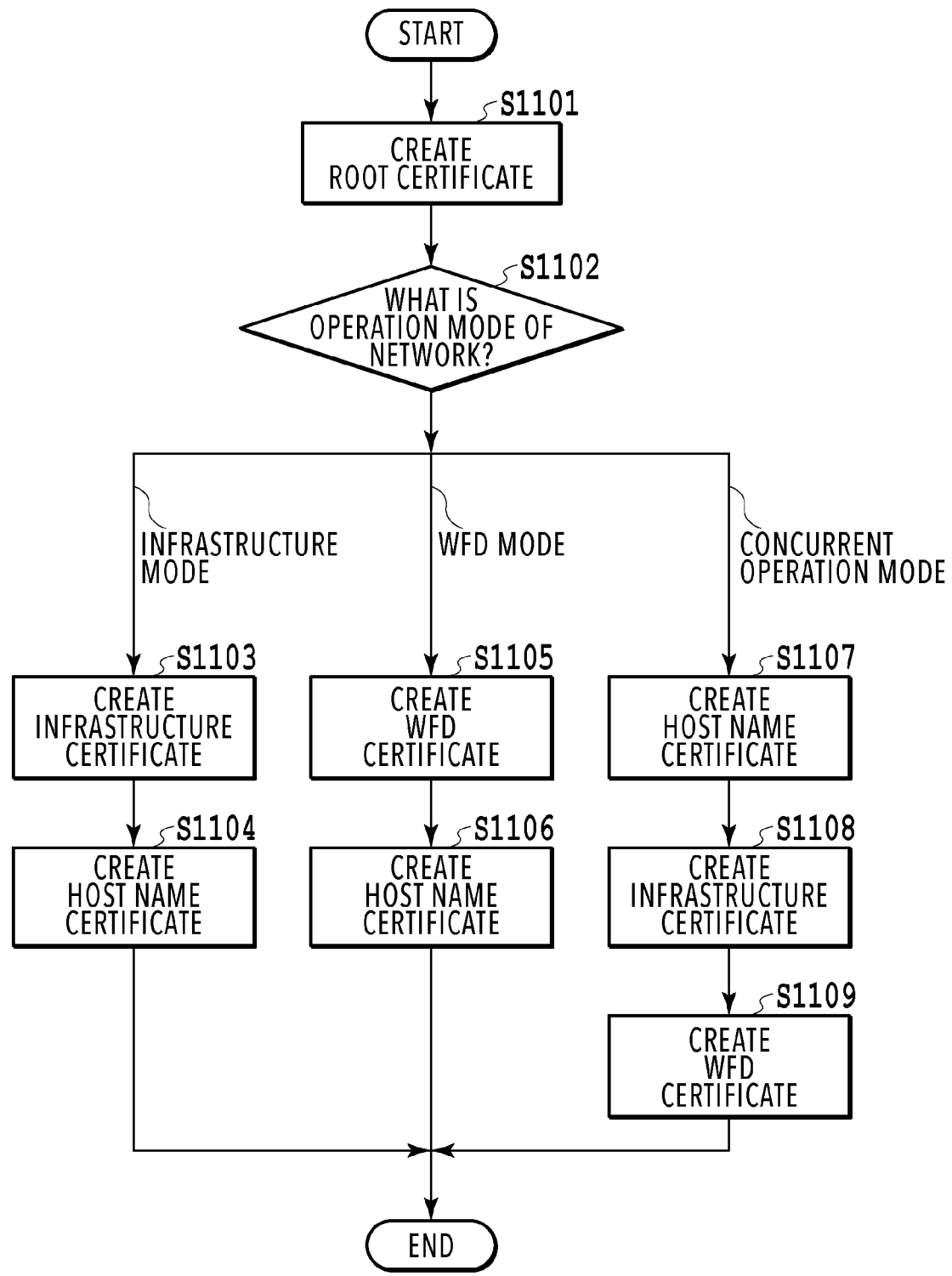
FIG. 11 is a flowchart of certificate creation processing in a second embodiment.

In the following, processing to create a server certificate is explained by using FIG. 11, which is performed by the MFP 120 that activates in a specific operation mode and whose IP address and host name are determined in the case where a root certificate is not created.

First, at step S1101, a root certificate is created.

Next, at step S1102, what is the current operation mode of the MFP 120 is determined. In the case where the results of the determination indicate that the current operation mode of the MFP 120 is the infrastructure mode, the processing advances to step S1103. In the case where the current operation mode of the MFP 120 is the WFD mode, the processing advances to step S1105. In the case where the current operation mode of the MFP 120 is the concurrent operation mode, the processing advances to step S1107.

In the case where the current operation mode of the MFP 120 is the infrastructure mode, at step S1103, an infrastructure certificate is created and next, at step S1104, a host name certificate is created, and the series of processing terminates. As described above, in the case where the MFP 120 is operating in the infrastructure mode, the MFP 120 does not operate in the WFD mode that requires a WFD certificate, and therefore, no WFD certificate is created. Here, the host name certificate is created after the infrastructure certificate is created, but the order of creating these certificates may be opposite.

In the case where the current operation mode of the MFP 120 is the WFD mode, at step S1105, a WFD certificate is created and next, at step S1106, a host name certificate is created and the series of processing terminates. As described above, in the case where the MFP 120 is operating in the WFD mode, the MFP 120 does not operate in the infrastructure mode that requires an infrastructure certificate, and therefore, no infrastructure certificate is created. Here, the host name certificate is created after the WFD certificate is created, but the order of creating these certificates may be opposite.

In the case where the current operation mode of the MFP 120 is the concurrent operation mode, at step S1107, a host name certificate is created and next, at step S1108, an infrastructure certificate is created and, at step S1109, a WFD certificate is created and the series of processing terminates. As described above, in the case where the MFP 120 is operating in the concurrent operation mode, first, the host name certificate that can be used both in the infrastructure mode and in the WFD mode is created and then the infrastructure certificate and the WFD certificate are created in this order. The order of creating the infrastructure certificate and the WFD certificate may be opposite.

In the present embodiment, the case is shown where the root certificate is not created yet, but in the case where the root certificate is already created, the server certificate is created as needed in accordance with priority. Specifically, the same determination as that in the first embodiment (step S707, step S712 in FIG. 7) is performed and the server certificate is created based on the determination results.

<Effects and the Like of the Present Embodiment>

In the present embodiment, the server certificates that are created in accordance with the operation mode are limited and priority at the time of creating the server certificates is determined. Specifically, in a specific operation mode (infrastructure mode, WFD mode), only the server certificate having a possibility of being used is created, and on the other hand, the server certificate not having a possibility of being used is not created, and thereby, it is made possible to reduce the processing load of the MFP 120. Further, in the concurrent operation mode, first, the host name certificate that can be used both in the infrastructure mode and in the WFD mode is created, and thereby, it is made possible to provide SSL communication in one of both the modes earlier compared to the case where the host name certificate is created last.

The present embodiment is not limited to that described above. For example, in the above-described example, the WFD certificate including the information on the IP address and the host name certificate that puts together the information on the host names are created separately, but it may also be possible to describe the IP address in the WFD mode in the SANs of the host name certificate. Further, in this case, it may also be possible to omit creation of the WFD certificate.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

By the present invention, it is made possible to reduce the storage capacity necessary to save server certificates while enabling encrypted communication, such as SSL communication, whose convenience is high in the case where a plurality of server certificates is created.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-094769, filed May 11, 2017, which is hereby incorporated by reference wherein in its entirety.

What is claimed is:

1. A server that creates a server certificate that is necessary for encrypted communication, the server comprising:
    a creation unit configured to create a first server certificate including based on information that fluctuates in accordance with a network environment, a second server certificate based on fixed information that does not fluctuate in accordance with the network environment, and a third server certificate that puts together information of a plurality of host names of the server, which a user can change; and
    a transmission unit configured to transmit one server certificate selected from the first, second, and third server certificates to a communication device, wherein
    the transmission unit transmits the first server certificate to the communication device in a case where an IP address in an infrastructure mode is included in a request for the encrypted communication,
    the transmission unit transmits the second server certificate to the communication device in a case where an IP address in a P2P mode that does not use an external access point is included in the request,
    the transmission unit transmits the third server certificate to the communication device in a case where a host name of a Bonjour protocol, a host name of an LLMNR protocol, or a host name of a DDNS protocol is included in the request, and
    communication of the infrastructure mode is performed via an external access point outside the server and the communication device and communication of the P2P mode is performed without using the external access point.

2. The server according to claim 1, further comprising:
    a determination unit configured to determine which of the first server certificate, the second server certificate, and the third server certificate to transmit to the communication device in response to a request for encrypted communication transmitted from the communication device.

3. The server according to claim 1, wherein
    the server operates in one of the infrastructure mode, the P2P mode, and a concurrent operation mode in which the server operates both in the infrastructure mode and in the P2P mode.

4. The server according to claim 3, wherein the request for encrypted communication is Client Hello.

5. The server according to claim 3, wherein
the creation unit creates the first server certificate and the second server certificate after creating the third server certificate in a case where the server activates in the concurrent operation mode.

6. The server according to claim 1, wherein
the creation unit creates the first server certificate and the third server certificate without creating the second server certificate in a case where the server activates in the infrastructure mode, and
the creation unit creates the second server certificate and the third server certificate without creating the first server certificate in a case where the server activates in the P2P mode.

7. The server according to claim 1, wherein
the creation unit creates the third server certificate in a case where one of the plurality of host names of the server is changed by a user.

8. The server according to claim 1, wherein
the plurality of host names of the server includes a host name of a Bonjour protocol, a host name of an LLMNR protocol, and a host name of a DDNS protocol.

9. The server according to claim 1, further comprising:
a printing unit.

10. The server according to claim 1, wherein the P2P mode is a Wi-Fi Direct mode.

11. A control method of a server that creates a server certificate that is necessary for encrypted communication, the method comprising:
creating a first server certificate based on information that fluctuates in accordance with a network environment, a second server certificate based on fixed information that does not fluctuate in accordance with the network environment, and a third server certificate that puts together information of a plurality of host names of the server, which a user can change; and
transmitting one certificate selected from the of the created first, second, and third server certificates to a communication device, wherein
the first server certificate is transmitted to the communication device in a case where an IP address in an infrastructure mode is included in a request for the encrypted communication,
the second server certificate is transmitted to the communication device in a case where an IP address in a P2P mode that does not use an external access point is included in the request,
the third server certificate is transmitted to the communication device in a case where a host name of a Bonjour protocol, a host name of an LLMNR protocol, or a host name of a DDNS protocol is included in the request, and
communication of the infrastructure mode is performed via an external access point outside the server and the communication device and communication of the P2P mode is performed without using the external access point.

12. The control method according to claim 11, further comprising:
determining which of the first server certificate, the second server certificate, and the third server certificate to transmit to the communication device in response to a request for encrypted communication transmitted from the communication device.

13. The control method according to claim 11, wherein
the server operates in one of the infrastructure mode, the P2P mode, and a concurrent operation mode in which the server operates both in the infrastructure mode and in the P2P mode.

14. The control method according to claim 13, wherein the request for encrypted communication is Client Hello.

15. The control method according to claim 11, wherein
the creation unit creates the first server certificate and the third server certificate without creating the second server certificate in a case where the server activates in the infrastructure mode, and
the creation unit creates the second server certificate and the third server certificate without creating the first server certificate in a case where the server activates in the P2P mode.

16. The control method according to claim 11, wherein
the first server certificate and the second server certificate are created after the third server certificate is created in a case where the server activates in the concurrent operation mode.

17. The control method according to claim 11, wherein
the third server certificate is created in a case where one of the plurality of host names of the server is changed by a user.

18. The control method according to claim 11, wherein
the plurality of host names of the server includes a host name of a Bonjour protocol, a host name of an LLMNR protocol, and a host name of a DDNS protocol.

19. The method according to claim 11, wherein the P2P mode is a Wi-Fi Direct mode.

20. A non-transitory computer readable storage medium storing a program for causing a computer to perform a control method of a server that creates a server certificate that is necessary for encrypted communication, the method comprising:
creating a first server certificate based on information that fluctuates in accordance with a network environment, a second server certificate based on fixed information that does not fluctuate in accordance with the network environment, and a third server certificate that puts together information of a plurality of host names of the server, which a user can change; and
transmitting one of the created first, second, and third server certificates to a communication device, wherein
the first server certificate is transmitted to the communication device in a case where an IP address in an infrastructure mode is included in a request for the encrypted communication,
the second server certificate is transmitted to the communication device in a case where an IP address in a P2P mode that does not use an external access point is included in the request,
the third server certificate is transmitted to the communication device in a case where a host name of a Bonjour protocol, a host name of an LLMNR protocol, or a host name of a DDNS protocol is included in the request, and
communication of the infrastructure mode is performed via an external access point outside the server and the communication device and communication of the P2P mode is performed without using the external access point.

* * * * *